United States Patent [19]

Maresca

[11] Patent Number: 4,611,033

[45] Date of Patent: Sep. 9, 1986

[54] PROCESS FOR STABILIZING A POLY(ARYL ETHER KETONE)

[75] Inventor: Louis M. Maresca, Belle Mead, N.J.

[73] Assignee: Union Carbide Corporation, Danbury, Conn.

[21] Appl. No.: 710,120

[22] Filed: Mar. 11, 1985

[51] Int. Cl.$^4$ .................................................. C08G 67/00
[52] U.S. Cl. .................................... 525/419; 524/599; 525/534; 528/486; 528/492; 528/493
[58] Field of Search ................ 524/599; 525/419, 534; 528/486, 492, 493

[56] References Cited

U.S. PATENT DOCUMENTS 4,296,217 10/1981 Stuart-Webb ..................... 525/534
4,487,918 12/1984 Heitz et al. ........................ 525/534

Primary Examiner—Lester L. Lee
Attorney, Agent, or Firm—Donald M. Papuga

[57] ABSTRACT

Described herein is a process for stabilizing a poly(aryl ether ketone), polymer produced by reacting a nucleophilic coreactants with an electrophilic coreactants under Friedel-Crafts polymerization conditions which process comprises treating the polymer so produced with a dicarbonyl chelating agent.

9 Claims, No Drawings

PROCESS FOR STABILIZING A POLY(ARYL ETHER KETONE)

TECHNICAL FIELD

This invention is directed to a process for stabilizing a poly(aryl ether ketone) polymer produced by reacting a nucleophilic coreactants with an electrophilic coreactant under Friedel-Crafts polymerization conditions which process comprises treating the polymer so produced with a dicarbonyl chelating agent.

BACKGROUND OF THE INVENTION

It is well known in the art to prepare polyketones by Friedel-Crafts polymerization conditions. For example, U.S. Pat. Nos. 3,065,205; 3,516,966 and 3,441,538 describe the preparation of aromatic polyketones by Friedel-Crafts polymerization techniques utilizing typical Friedel-Crafts catalysts such as aluminum chloride, antimony pentachloride, ferric chloride, aluminum bromide, ferric bromide, etc. However, aromatic polyketones produced by such a process have been found to contain significant amounts of residual metal from the catalyst. This is a particular problem when aluminum chloride is used as the catalyst. Aluminum is different to remove since it is held tightly to the polymer as a complex with the carbonyl group in the polymer. The residual metal leads to thermal instability of the polymer at the high temperatures which are needed in order to fabricate the polymer.

THE INVENTION

A process for stabilizing a poly(aryl ether ketone) polymer produced by reacting a nucleophilic coreactant with an electrophilic coreactant under Friedel-Crafts polymerization conditions which process comprises treating the polymer so produced with a dicarbonyl chelating agent. It has now been found the the residual metal content in the formed polymer may be significantly reduced by treating the polymer so produced with a dicarbonyl chelating agent.

The poly(aryl ether ketones) which are suitable for use in this invention are those which are prepared by Friedel-Craft condensation polymerization.

The polyketones may be prepared by reacting:

(a) a mixture of substantially equimolar amounts of (i)

at least one electrophilic aromatic diacyl halide of the formula

YOC—Ar—COY where —Ar— is a divalent aromatic radical such as phenylene, diphenylether-4,4'-diyl, diphenyl-4,4'-diyl, naphthalene, and the like, Y is halogen, preferably chlorine, and COY is an aromatically bound acyl halide group, which diacyl halide is polymerizable with at least one aromatic compound of (a)(ii), and (ii)

at least one aromatic nucleophilic compound of the formula

H—Ar'—H where —Ar'— is a divalent aromatic radical such as diphenylether-4,4'-diyl, 2,7-dibenzofurane diyl, diphenyl-4,4'-diyl, diphenylmethane-4,4'-diyl, naphthalene-diyl, phenanthrene-diyl, anthracene-diyl, and the like, and H is an aromatically bound hydrogen atom, which compound is polymerizable with at least one diacyl halide of (a)(i), and (b) at least one aromatic monoacyl halide of formula H—Ar''—COY where —Ar''— is a divalent aromatic radical such as diphenylether-4,4'-diyl, phenoxynaphthalene-3,4'-diyl, diphenylmethane-4,4'-diyl, 2,7-dibenzofurane-diyl, 2,7-naphthalene-diyl, and the like, and H is an aromatically bound hydrogen atom, Y is as defined above, and COY is an aromatically bound acyl halide group, which monoacyl halide is self-polymerizable, and (c) a combination of (a) and (b).

Specifically, the polyketones may be prepared by reacting any of the well-known aromatic nucleophilic coreactants such as diphenyl sulfide, dibenzofuran, thianthrene, phenoxathin, dibenzodioxine, phenodioxin, diphenylene, diphenyl, 4,4'-diphenoxybiphenyl, xanthone, 2,2'-diphenoxybiphenyl, 1,2-diphenoxybenzene, 1,4-diphenoxybenzene, 1,3-diphenoxybenzene, 1-phenoxynaphthalene, 1,2-diphenoxynapthalene, diphenyl ether, 1,5-diphenoxynapthalene and the like.

Similarly, the following electrophilic aromatic coreactant candidates may be mentioned: terephthaloyl chloride, isophthaloyl chloride, thio-bis(4,4'-benzoyl chloride), benzophenone-4,4'-di(carbonyl chloride), oxy-bis(3,3'-benzoyl chloride), diphenyl-3,3'-di(carbonyl chloride), carbonyl-bis(3,3'-benzoyl chloride), sulfonyl-bis(4,4'-benzoyl chloride), sulfonyl-bis(3,3'-benzoyl chloride), sulfonyl-bis(3,4'-benzoyl chloride), thio-bis(3,4'-benzoyl chloride), diphenyl-3,4'-di(carbonyl chloride), oxy-bis[4,4'-(2-chlorobenzoyl chloride)], naphthalene-1,6-di(carbonyl chloride), napthalene-1,5-di(carbonyl chloride), naphthalene-2,6-di(carbonyl chloride), oxy-bis[7,7'-naphthalene-2,2'-di(carbonyl chloride)], thio-bis[8,8'-naphthalene-1,1-di(carbonyl chloride)], [7,7'-binaphthyl-2,2'-di(carbonyl chloride)], diphenyl-4,4'-di(carbonyl chloride), carbonyl-bis[7,7'-naphthalene-2,2'-di(carbonyl chloride)], sulfonyl-bis[6,6'-naphthalene-2,2'-di(carbonyl chloride)], dibenzofuran-2,7-di(carbonyl chloride) and the like.

In addition to the electrophilic aromatic coreactants, carbonyl chloride (phosgene), carbonyl bromide, carbonyl fluoride or oxaloyl chloride can be used.

Examples of compounds corresponding to the formula H—Ar''—COY include p-phenoxybenzoyl chloride, p-biphenyloxybenzoyl chloride, 4-(p-phenoxyphenyl) benzoyl chloride, 4-(p-phenoxyphenoxy) benzoyl chloride, 3-chlorocarbonyl dibenzofuran, 1-naphthoyl chloride, 2-naphthoyl chloride, and the like.

Preferably, diphenyl ether is reacted with terephthaloyl chloride and/or isophthaloyl chloride.

The preferred Friedel-Crafts catalysts are aluminum chloride, antimony pentachloride and ferric chloride. Other Friedel-Crafts catalysts, such as aluminum bromide, boron trifluoride, zinc chloride, antimony trichloride, ferric bromide and stannic chloride, can also be used.

The polymerization is generally carried out in the presence of a solvent. The preferred organic solvent is 1,2-dichloroethane as described in U.S. patent application Ser. No. 710,119 filed Mar. 11, 1985 filed in the names of L. M. Maresca et al. titled "An Improved Process For Preparing Poly(aryl ether ketones)", filed on the same date as this application and commonly assigned.

The coreactants and catalyst, such as aluminum chloride, are soluble in 1,2-dichloroethane. The polymer precipitates out of solution at an early stage and continues to polymerize in suspension. Other solvents, such as symmetrical tetrachloroethane, o-dichlorobenzene or carbon disulfide may also be employed.

The reaction may be carried out over a range of temperatures which are from about 0° C. to about 160° C. In general, it is preferred to carry out the reaction at a temperature in the range of 0° to 30° C. In some cases it is advantageous to carry out the reaction at temperatures above 30° C. or below 0° C. The reaction is generally carried out at atmospheric pressures. However, pressures higher or lower than atmospheric can also be used.

The reaction may be carried out in the presence of a capping agent as described in U.S. patent application Ser. No. 710,118 filed Mar. 11, 1985 filed on an even date as this application in the name of L. M. Maresca and titled, "A Method For Stabilizing Poly(Aryl Ether Ketones)", commonly assigned.

Said application is directed to a method of stabilizing poly(aryl ether ketones) by reacting nucleophilic coreactants or electrophilic coreactants under heterogeneous Friedel-Crafts polymerization conditions by adding a nucleophilic and/or electrophilic capping agent during polymerization.

The nucleophilic capping agents are of the general formula:

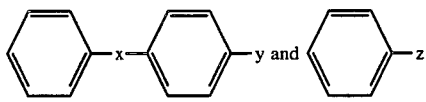

wherein x is a covalent bond, —O—, —S—, or —$CR_2$— wherein each R is independently hydrogen, an alkyl or fluoroalkyl group, preferably of 1 to 10 carbons, phenyl or an electron withdrawing group substituted phenyl. Preferably, x is a covalent bond or O, y is $NO_2$,

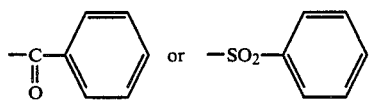

or if x is a covalent bond, y can also be hydrogen as well as any of the foregoing, z is halogen, alkyl or alkoxy Specific examples of appropriate nucleophilic capping agents are
4-nitrodiphenyl ether
4-phenoxybenzophenone
4-phenoxydiphenyl sulfone
anisole
fluorobenzene
chlorobenzene
biphenyl
toluene.

Electrophilic capping agents correspond to the formula

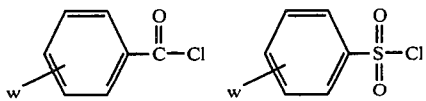

where w=halogen, alkyl, alkoxy, nitro, nitrile,

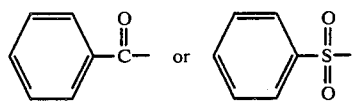

Specific examples of these end capping agents include the following
benzoyl chloride
p-fluorobenzoyl chloride p-chlorobenzoyl chloride
p-methoxybenzoyl chloride
benzene sulfonyl chloride
p-chlorobenzene sulfonyl chloride
p-methylbenzene sulfonyl chloride
4-benzoyl-benzoxyl chloride The polymer is generally treated with the dicarbonyl chelating agent prior to melt fabrication. The chelating agent can be used neat or as a solution in nonsolvents for the polymer such as acetone, methyl ethyl ketone, cyclohexanone, methanol, ethanol, methylene chloride, 1,2 dichloroethane, water, and the like. The wash is conducted at temperatures ranging from about 25° to about 200° C. The polymer is recovered by filtration.

The dicarbonyl chelating agents can have the general formula:

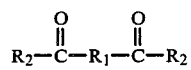

wherein $R_1$ is a saturated or unsaturated alkyl or cycloalkyl radical containing from 1 to 12 carbon atoms, or —Q—$R_3$—Q— wherein Q is N or O and $R_3$ is a saturated or unsaturated alkyl or cycloalkyl radical containing from 1 to 12 carbon atoms, $R_2$ is independently hydrogen, alkyl, cycloalkyl, or aryl containing from 1 to 12 carbon atoms, —O—$R_4$ wherein $R_4$ is independently hydrogen, alkyl, cycloalkyl or aryl containing from 1-12 carbon atoms or —N($R_4$)$_2$ wherein $R_4$ is as defined above.

Specific examples of appropriate dicarbonyl chelating agents include, methyl acetoacetate, ethyl acetoacetate, methyl-4-acetylbutyrate, dimethyl malonate, diethyl malonate, dimethyl succinate, dimethyl maleate, 2,3-butanedione, 2,4-pentanedione, 2,3-pentanedione, 2,3-hexanedione, 2,4-hexanedione 2,5-hexanedione, ethylene glycol diacetate, 1,6-hexamethylene diamine diacetamide, glutaraldehyde, and the like.

One or both of the carbonyl moieties can be included in a cyclic ring structure. Examples of such compounds include: 1,2-cyclohexanedione 1,3-cyclohexanedione, 1,2-cyclopentanedione, 2-acetylbutyrolactone, 3 acetylcoumerin, 2-acetylcyclohexanene and the like.

The polymers of this invention may include mineral fillers such as carbonates including chalk, calcite and dolomite; silicates including mica, talc, wollastonite; silicon dioxide; glass spheres; glass powders, aluminum; clay; quartz; and the like. Also, reinforcing fibers such as fiberglass, carbon fibers, and the like may be used. The polymers can also include additives such as titanium dioxide; thermal stabilizers, ultraviolet light stabilizers, plasticizers, and the like.

The polymers of this invention may be fabricated into any desired shape, i.e., moldings, coatings, films, or fibers. They are particularly desirable for use as electrical insulation for electrical conductors.

EXAMPLES

The following examples serve to give specific illustrations of the practice of this invention but they are not intended in any way to limit the scope of this invention.

COMPARATIVE EXAMPLE A; POLYMER PREPARATION

To a 5 liter, three neck flask equipped with a mechanical stirrer, thermometer and nitrogen inlet was charged 10.15 g (0.050 moles) of isophthaleyl chloride, 91.35 g (0.450 moles) of terephthalyl chloride, 85.25 g (0.5015 moles) of diphenyl ether, 0.42 g (0.0030 moles) of benzoyl chloride and 3500 ml of 1,2-dichloroethane. The solution was cooled to 5° C. in an ice bath. While maintaining a temperature of 5°-10° C., 173.35 g (1.20 moles) of aluminum chloride was added in portions over a ten minute time period. The reaction was held at 5°-10° C. for six hours during which time a precipitate formed. The mixture was then allowed to warm to ambient temperature and reacted for an additional 17 hours. The reaction slurry was poured into 6 liters of ice water containing 200 ml of concentrated hydrochloric acid. The resulting mixture was heated and the 1,2 dichloroethane distilled. After isolating the polymer granules by filtration they were washed sequentially with refluxing 5% hydrochloric acid (3 liters) for 1.5 hours, twice with water (1 liter) and twice with methanol (1 liter). The polymer was dried in a vacuum oven at 100° C. The final product had a reduced viscosity of 1.21 dl/g as measured in sulfuric acid (1 g/100 cc) at 25° C. and contained 320 ppm of residual aluminum. After 10 minutes in a melt flow indexer at 400° C. and under a 10 P weight, this material had no flow indicating severe polymer degradation via crosslinking.

EXAMPLE 1

Polymer from comparative example A (10 g) was refluxed in 190 g pentanedione for 2 hrs. The polymer was isolated by vacuum filtration washed twice with methanol (500 ml) and then dried in a vacuum over at 100° C. The reduced viscosity of the material was unchanged. However the residual aluminum concentration was 30 ppm and after 10 minutes at 400° C. in a melt flow cell under a 10 P weight, the polymer has a flow of 3.6 dg/min.

EXAMPLE 2

The 2,4 pentanedione wash procedure described in example #1 was repeated twice on a fresh sample of polymer. The residual aluminum concentration of the isolated product was below the detectable limit (L10 ppm). At 400° C. under a 10 P weight in a melt flow cell it has a flow of 28.2 dg/min.

EXAMPLE 3

Polymer from comparative example (5.0 g) was refluxed (~56° C.) in 5 g of 2,4-pentanedione and 90 g of acetone for 2 hrs. After isolating the resulting polymer by vacuum filtration it was washed twice with methanol (200 ml) and then dried in a vacuum at 100° C. Residual aluminum concentration in the polymer was 45 ppm.

COMPARATIVE EXAMPLE B

Example 3 was repeated using pure acetone (95 g). The residual aluminum concentration of the polymer remained at 370 ppm.

COMPARATIVE EXAMPLE C

Comparative example A was repeated except that he initial charge consisted of 96.40 g (0.475 moles) of terephthalryl chloride, 5.10 g (0.025 moles) of isophthalryl chloride, 87.15 g (0.5125 moles) of diphenyl ether, 3.50 g (0.025 moles) of benzoyl chloride and 3500 ml of 1,2-dichloroethane. The resulting polymer had a reduced viscosity of 0.59 dl/g as measured in sulfuric acid (1 g/100 cc) at 25° C. and residual aluminum concentration of 410 ppm. After 10 minutes at 400° C. and under a 1 P weight in the melt flow cell this polymer had a melt flow of 0.28 dg/min.

EXAMPLE 4

Polymer made in comparative example C (100 g) was refluxed (~55°) in 100 g of 2,4-pentanedione and 900 g of acetone for 2 hours. After isolating the polymer by vacuum filtration, it was washed with acetone (500 ml) and dried in a vacuum oven at 100° C. Residual aluminum concentration was 25 ppm. The material had a melt flow of 6.68 dg/min. after 10 minutes at 400° C. in the melt flow cell under a 1 P weight.

EXAMPLE 5

The 2,4-pentanedione was described in example 4 was repeated twice on a fresh sample of polymer from comparative example 3. Residual aluminum concentration was 10 ppm and the melt flow of the final product after 10 minutes at 400° C. in the melt flow all under an 1 P weight was 61.66 dg/min.

What is claimed is:

1. An improved process for stabilizing a poly(arylether ketone) polymer produced by reacting a nucleophilic coreactant with an electrophilic coreactant under Friedel-Crafts polymerization conditions wherein the improvement comprises treating the polymer so produced with a dicarbonyl chelating agent of the general formula

wherein $R_1$ is a saturated or unsaturated alkyl or cycloalkyl radical containing from 1 to 12 carbon atoms, or —Q—$R_3$—Q— wherein Q is N or O and $R_3$ is a saturated or unsaturated alkyl or cycloalkyl radical containing 1 to 12 carbon atoms, $R_2$ is independently hydrogen, alkyl, cycloalkyl, or aryl containing from 1 to 12 carbon atoms, —O—$R_4$ wherein $R_4$ is independently hydrogen, alkyl, cycloalkyl or aryl containing from 1–12 carbon atoms or —N($R_4$)$_2$ wherein $R_4$ is as defined above.

2. A process as defined in claim 1 wherein the chelating agent is selected from one or more of methyl acetoacetate, ethyl acetoacetate, methyl-4-acetylbutyrate, dimethyl malonate, diethyl malonate, dimethyl succinate, dimethyl maleate, 2,3-butanedione, 2,4-pentanedione, 2,3-pentanedione, 2,3-hexanedione, 2,4-hexanedione, 2,5-hexanedione, ethylene glycol diacetate, or 1,6-hexamethylene diamine diacetamide.

3. A process as defined in claim 1 wherein the polymer is treated with a solution containing the dicarbonyl chelating agent.

4. A process as defined in claim 3 wherein the dicarbonyl chelating agent is dissolved in acetone, methyl ethyl ketone, cyclohexanone, methanol, ethanol, methylene chloride, 1,2 dichloroethane, or water.

5. A process as defined in claim 1 wherein the poly(aryl ether ketone) is prepared by reacting one or more of the following nucleophilic coreactants: diphenyl sulfide, dibenzofuran, thianthrene, phenoxathin, phenodioxin, diphenylene, diphenyl 4,4'-diphenoxybiphenyl, 2,2'-diphenoxylbiphenyl, 1,2-diphenoxybenzene, 1,3-diphenoxybenzene, 1,4-diphenoxybenzene, 1-phenoxynaphthalene, 1,2-diphenoxynaphthalene, diphenyl ether, or 1,5-diphenoxynaphthalene.

6. A process as defined in claim 1 wherein the poly(aryl ether ketone) is prepared by reacting one or more of the following electrophilic coreactants: phosgene, carbonyl diflouride, terephthaloyl chloride, isophthaloyl chloride, thio-bis(4,4'-benzoyl chloride), benzophenone-4,4'-di(carbonyl chloride), oxy-bis(4,4'-benzoyl chloride), oxy-bis(3,3'-benzoyl chloride), diphenyl-3,3'-di(carbonyl chloride), carbonyl-bis(3,3'-benzoyl chloride), sulfonyl-bis(4,4'-benzoyl chloride), sulfonyl-bis(3,3'-benzoyl chloride), sulfonyl-bis(3,4'-benzoyl chloride), thio-bis(3,4'-benzoyl chloride), thio-bis(4,4'-benzoyl chloride, diphenyl-4,4'-di(carbonyl chloride), diphenyl-3,4'-di(carbonyl chloride), oxy-bis[4,4'-(2-chlorobenzoyl chloride)], naphthalene-1,5-di(carbonyl chloride), naphthalene-1,6-di(carbonyl chloride), naphthalene-1,7-di(carbonyl chloride), naphthalene-2,6-di(carbonyl chloride), oxy-bis[7,7'-naphthalene-2,2'-di(carbonyl chloride)], thio-bis[8,8'-naphthalene-2,2'-di(carbonyl chloride)], 7,7'-binaphthyl-2,2'-di(carbonyl chloride), carbonyl-bis[7,7'-naphthalene-2,2'-di(carbonyl chloride)], sulfonyl-bis[6,6'-naphthalene-2,2'-di(carbonyl chloride)], or benzofuran-2,7-di(carbonyl chloride).

7. A process as defined in claim 1 wherein diphenyl ether is reacted with terephthaloyl chloride and/or isophthaloyl chloride.

8. A process as defined in claim 1 wherein the process is carried out in the presence of a Friedel-Crafts catalyst selected from aluminum chloride, antimony pentachloride or ferric chloride.

9. A process as defined in claim 1 wherein the process is carried out at a temperature of from about 0° C. to about 25° C.

* * * * *